United States Patent [19]

Klee

[11] 3,817,114

[45] June 18, 1974

[54] CHAIN TIGHTENER FOR ENDLESS CHAIN

[75] Inventor: Maurice Klee, Burlington, Iowa

[73] Assignee: J. I. Case Company, Racine, Wis.

[22] Filed: Jan. 29, 1973

[21] Appl. No.: 327,741

[52] U.S. Cl. .......................................... 74/242.1 FP
[51] Int. Cl. ............................................. F16h 7/12
[58] Field of Search ............ 74/242.1 FP, 242.15 R

[56] References Cited
UNITED STATES PATENTS

| | | | |
|---|---|---|---|
| 2,051,488 | 8/1936 | Kottlowski et al. | 74/242.1 FP |
| 2,818,311 | 12/1957 | Ashley, Jr. | 74/242.1 FP |
| 3,599,506 | 8/1971 | Freese | 74/242.1 FP |
| 3,626,776 | 12/1971 | Staudinger et al. | 74/242.11 S |
| 3,636,786 | 1/1972 | Buck | 74/242.11 R |

Primary Examiner—Leonard H. Gerin
Attorney, Agent, or Firm—Dressler, Goldsmith, Clement & Gordon, Ltd.

[57] ABSTRACT

The invention disclosed herein relates to a chain tightener assembly for adjusting the tension of an endless chain entrained over a pair of spaced sprockets. The chain tightener consists of a carrier rotatably supporting a pair of idler sprockets respectively engaging opposite surfaces of the chain.

The carrier is moved by a fluid ram consisting of a cylinder supported on a fixed pivot axis and a piston secured to the carrier. The cylinder has a relief valve communicating with an internal chamber and a fitting to allow fluid, such as grease, to be pumped into the chamber. The relief setting of the relief valve means defines the tension of the chain produced by the fluid and a plug normally seals the relief valve means to prevent actuation during operation of the vehicle. The fluid ram also has indicating means for indicating a worn condition for the chain.

10 Claims, 3 Drawing Figures

CHAIN TIGHTENER FOR ENDLESS CHAIN

BACKGROUND OF THE INVENTION

Numerous vehicles of the track or wheel type to perform various material handling operations have been proposed. One type of vehicle that has recently received a remarkable degree of attention is the small wheel type unit wherein all four wheels of the unit are driven and the steering or turning movement is accomplished by driving the two pair of wheels on opposite sides of the vehicle at different speeds in the same or opposite directions.

The drive mechanism utilized for machines of this type normally include identical drive means for each pair of wheels respectively located on opposite sides of the vehicle. For example, one type of drive means utilized for machines of this type is what is referred to as a clutch drive and is shown for example in Julh et al. U.S. Pat. No. 3,340,942. Another type of drive means is what is referred to as the hydrostatic drive is shown in Bauer U.S. Pat. No. 3,635,365.

In both types of drive means, the driving mechanism connected to the respective wheels on one side of the vehicle is enclosed in a sealed compartment which defines the chamber for a lubricating fluid, such as oil. The drive mechanism between the driving member, either the clutches or the fluid motor, usually incorporates an endless chain that is also in the sealed compartment and is entrained over a drive sprocket and at least one driven sprocket. In some units, a single chain is utilized and is entrained over the drive sprocket and the pair of driven sprockets respectively connected to the pair of wheels, such as shown in the Bauer patent, while in other instances, separate chains ar utilized between the drive sprocket and the respective driven sprockets. In other instances, one wheel may be directly connected to the drive output and the second wheel may be driven by a drive sprocket connected to the first wheel and a driven sprocket connected to the second wheel with a chain entrained over both sprockets.

In all instances of this type, difficulties have been encountered in providing a satisfactory means for tensioning the chain or chains that are located in the sealed compartments. For example, the normal tensioning mechanism, such as disclosed in the Bauer patent, requires that a wrench be placed into the sealed compartment to adjust the tension of the chain or chains.

Since the idler sprocket must of necessity be located in the sealed compartment and is preferably partially submerged in the lubricating fluid, it is sometimes difficult to provide the necessary access to the adjusting means for the idler sprocket.

SUMMARY OF THE INVENTION

According to the present invention, the tensioning means or chain tightening means that cooperates with the endless chain located within the sealed side compartment of a skid type vehicle, is a fluid operated mechanism that requires only limited access space from the outside of the compartment to provide the necessary adjustment for the chain.

The chain tightening mechanism cooperates with a drive means for propelling a vehicle that includes at least one wheel having a sprocket connected thereto and a drive sprocket spaced from the wheel sprocket with a chain entrained over the two sprockets. The chain tightening means consists of at least one idler sprocket rotatably supported on a carrier with a fluid ram consisting of a cylinder supported adjacent the carrier and a piston reciprocable in the cylinder and connected to the carrier so that the supply of incompressible fluid to the cylinder will extend the piston and move the carrier resulting in tensioning of the chain.

According to one aspect of the invention, the fluid ram incorporates relief valve means operable to relieve excess fluid when the pressure of the fluid in the cylinder exceeds a certain level which defines the tension for the chain. The relief valve means is located in a threaded aperture that has a removable plug so that the relief valve means can be rendered inoperable during normal use of the vehicle by inserting the plug into the threaded opening.

According to a further aspect of the invention, the chain tightening means or mechanism also incorporates indicating means for showing that the chain has reached a predetermined worn condition. In the illustrated embodiment, this mechanism is incorporated into the fluid ram and is designed to prevent further tensioning of the chain when the chain has reached the predetermined worn condition.

The indicating means prevents further extension of the piston with respect to the cylinder when the worn condition has been reached. This is accomplished by placing the chamber defined between the cylinder and piston in communication with the surrounding atmosphere when the piston has reached a predetermined extended position. In the illustrated embodiment, the communication is produced by an annular groove that is located in the opening which slidably supports the piston in the cylinder and a bore that communicates at one end with the end of the piston in the cylinder and at its opposite end with the periphery of the piston at a location spaced from the piston end in the cylinder. With such an arrangement, the chamber is placed in communication with the atmosphere when the predetermined extended position of the piston rod is reached to thereby prevent pressurization of the chamber and further extension of the piston.

According to the specific aspect of the invention, the carrier is supported for free pivotal movement on the end of the piston and has a pair of idler sprockets rotatably supported thereon and respectively engaging opposite surfaces of the chain to produce the necessary amount of pivotal movement of the carrier for tensioning the chain.

BRIEF DESCRIPTION OF SEVERAL VIEWS OF DRAWINGS

DETAILED DESCRIPTION

Figure 1:
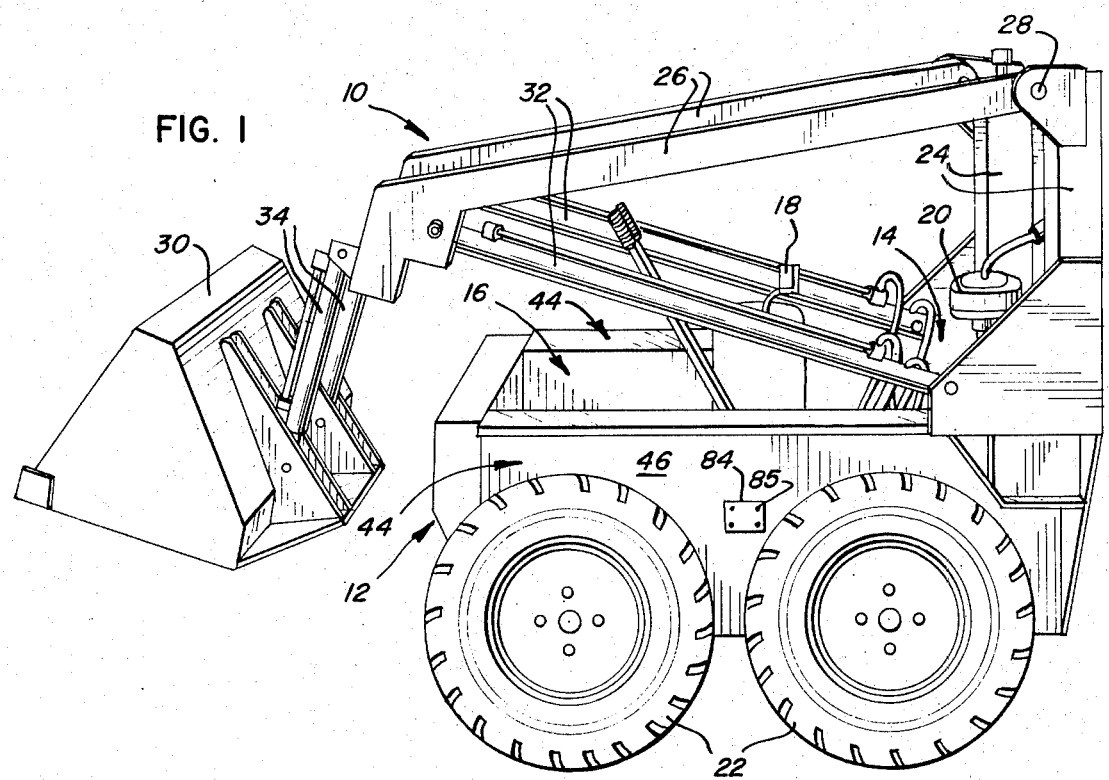
FIG. 1 is a perspective view of a skid-steer vehicle having the present invention incorporated therein.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings shows an overall construction of an exemplary skid-steer vehicle that may have the present invention incorporated therein. Vehicle 10 has an elongated generally U-shaped body 12 that has an engine space 14 adjacent the rear end thereof and a forward space 16 at the opposite end with a seat 18 located intermediate the ends. Engine 20 is located in the engine space 14 while forward space 16 is designed for the operator's legs.

Vehicle further includes first and second pairs of wheels 22 (only one pair being shown) respectively located on opposite sides of the body 12 and stanchions 24 projecting upwardly from the body on each side of the engine space. A lift arm is pivotally connected at 28 to the upper end of each stanchion 24.

The left arms project forwardly along the body and downwardly adjacent the forward end with a material handling member 30, such as a bucket, pivotally connected to the ends of the respective lift arms. Hydraulic fluid rams 32 are positioned between each stanchion and its associated lift arm so that the lift arms may be raised and lowered on the vehicle. Also, hydraulic fluid rams 34 are located between the material handling member and the lift arms to pivot the material handling member relative to the lift arms.

As was indicated above, the drive mechanism for the vehicle includes drive means for each pair of wheels located on the opposite sides of the vehicle. In the illustrated embodiment, the drive means consists of sprockets 40 respectively connected to the two wheels 22 located on one side of the vehicle. One of the sprockets 40 may be driven from a suitable power source, such as a hydraulic motor driven by a hydraulic pump (not shown), while the other drive sprocket is driven by the first sprocket. Thus, for purposes of claimed terminology, one sprocket 40 has been designated as a drive sprocket while the other sprocket 40 has been designated as a spaced wheel sprocket with chain 42 entrained over the two sprockets.

It will be appreciated that the drive arrangement may take any number of forms, such as a separate drive sprocket engaging the chain 42 between sprockets 40 or separate chains leading from the drive sprocket to the respective sprockets 40.

In the vehicle of the type described above, the chain or chains and sprockets are all located in side compartment 44 (FIG. 1) that includes spaced side plates 46 that define a sealed compartment for receiving lubricating fluid for the chain and various sprockets.

Figure 2:
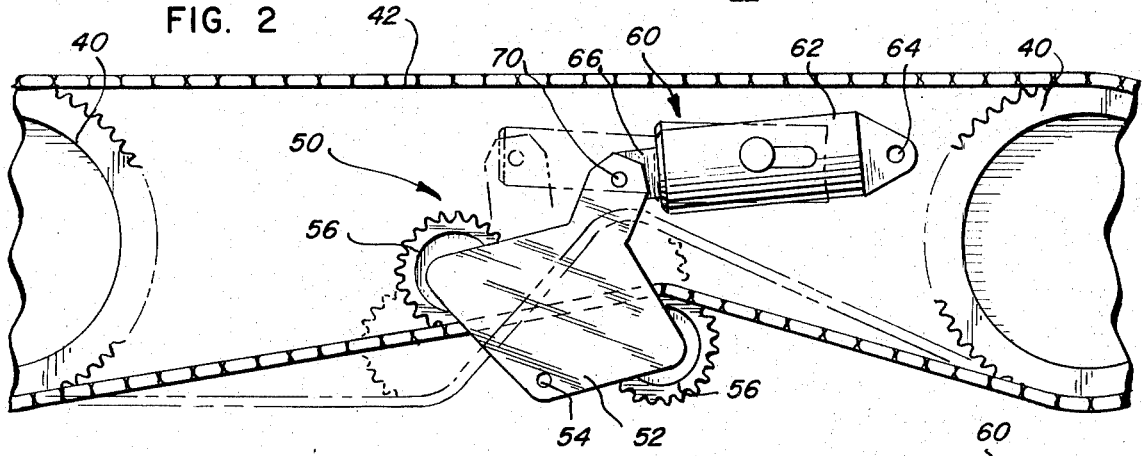
FIG. 2 is a schematic illustration of the drive means for a pair of wheels on one side of the vehicle with the tensioning means of the present invention incorporated therein.

According to the present invention, the drive means for each pair of wheels 22 also incorporates chain tightening or tensioning means 50 for maintaining the desired tension on sprocket chain 42. The chain tensioning means is generally shown in FIG. 2 and consists of one or more carrier plates 52 pivoted about a fixed pivot pin 54 that is connected to one of the side plates 46 defining one of the compartments 44. Carrier 52 supports a pair of idler sprockets 56 which respectively engage the sprocket chain 42 on the opposed surfaces or the inner and outer surfaces thereof.

Carrier 52 is pivoted about pin 54 through moving means consisting of a fluid ram 60 that has its cylinder 62 pivotally supported on a fixed support, such as a pin 64, while a piston 66 is reciprocated in an opening 68 defined in cylinder 62. The free end of piston 66 is connected by pin 70 to the opposite end of the one or more carriers 52.

Figure 3:
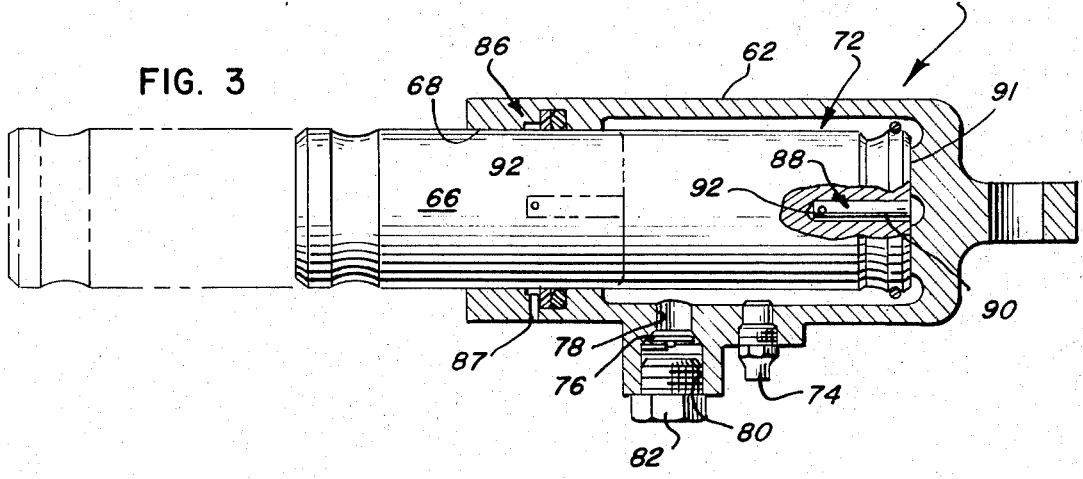
FIG. 3 is an enlarged sectional view of the fluid ram forming part of the tensioning means.

As was explained above, the moving means or fluid ram 60 incorporates mechanism that automatically sets the tension of the chain at a desired level and indicating means for indicating a worn condition for the chain. The details of these mechanisms are shown in FIG. 3. Piston 66 is reciprocable in opening 68 and cooperates with cylinder 62 to define a chamber 72. Cylinder 62 has grease gun fitting means 74 cooperating therewith and communicating with chamber 72. Fitting means 74 is utilized for supplying an incompressible fluid, such as grease, to the chamber 72 to thereby extend the piston rod 66 and pivot the carrier 52 about pivot pin 54.

The means for automatically setting the tension of the chain, which is incorporated into fluid ram 60, consists of relief valve means 76 that is supported in an opening 78, the outer end of which has a threaded portion 80 that receives a threaded plug or member 82.

In operation, the relief valve 76 is set to open when the pressure of the fluid in chamber 72 is at a predetermined level. This level in turn determines the amount of tension applied to the chain by the tensioning means 50.

The grease gun fitting 74 and plug 82 are positioned to be closely adjacent to each other as shown in FIG. 3 and accessible through a removable cover plate 84 (FIG. 1) removably secured by screws 85 to one of the side plates. While the removable cover has been shown as being on the outside side plate 46, for purposes of simplicity, it will be appreciated that the cover plate could readily be located on the inside plate 46.

The tensioning apparatus so far described is believed to be understood from the above description but a brief summary will be made for purposes of completeness.

If it is desired to tension the chain, removable cover plate 84 is removed so that fitting means or ball-check grease fitting 74 and plug 82 are accessible from the outside of the sealed compartment. Plug 82 is then removed to expose relief valve means 76 to the surrounding atmosphere. A grease gun is then inserted over the ball-check grease fitting 74 and the grease, which is an incompressible fluid, is introduced into chamber 72 to extend piston 66 and pivot carrier 52 on pivot pin 54. When the pressure of the incompressible fluid in chamber 72 reaches a desired level, determined by the pressure setting of relief valve means 76 any additional fluid will escape through relief valve 76. Thus, the pressure setting of relief valve means 76 determines the amount of tension applied to sprocket chain 42.

When the desired tension of the chain has been set, plug 82 is threaded into threaded opening to render relief valve means 76 inoperable during normal operation of the vehicle. The removable cover 84 is then replaced and the vehicle is ready for normal operation.

According to another aspect of the present invention, fluid ram 60 also incorporates indicating means for showing that the chain 42 has reached a predetermined worn condition the needs replacement. This mechanism is incorporated so as to prevent further tensioning of the chain when the maximum extension of chain 42 has been reached.

As most clearly shown in FIG. 3, the indicating means is designed to prevent further extension of piston 66 with respect to cylinder 62 which in turn prevents further tensioning of chain 42. The indicating means incorporates means for placing the chamber 72 in communication with the surrounding atmosphere to prevent further extension of the piston when the piston reaches the predetermined extended position. This mechanism is clearly shown in FIG. 3 and includes an annular groove 86 in opening 68 which slidably supports piston 66. Piston 66 also has a bore 88 that has one end in communication with chamber 72 and the opposite end adapted to be placed in communication with annular groove 86. In the specific illustrated embodiment, bore 88 consists of a counterbore portion 90 that extends axially from the inner end 91 of piston 66 with the base of counterbore communicating with the periphery of piston 66 through a cross-bore 92.

When the piston 66 reaches the dotted line position of FIG. 3, cross-bore 92 is in communication with annular groove 86 to place chamber 72 in communication with the surrounding atmosphere through bore 88, surrounding annular groove 86 and opening 87.

As can be seen from the above description, the present invention provides a simple and inexpensive mechanism that can be incorporated into relatively inaccessible places for producing the desired tension upon a remotely located chain.

While a specific embodiment of the present invention has been described, numerous modifications come to mind without departing from the spirit of the invention. For example, while two idler sprockets 56 have been shown as being supported on carrier 52, it is readily apparent that a single sprocket could perform the same function but would require additional pivotal movement to produce the desired tension on the chain. Also, numerous other ways could be utilized for placing chamber 72 in communication with the surrounding atmosphere. For example, the bore 90 could be extended outwardly so that the cross-bore 92 would be located outside the cylinder and provide the necessary communication and prevent pressurization of chamber 72.

I claim:

1. Drive means for propelling a vehicle including at least one wheel having a driven sprocket connected thereto and a drive sprocket spaced from the driven sprocket with a chain entrained over the sprockets; chain tightening means including at least one idler sprocket engaging said chain between said drive and driven sprockets, a carrier rotatably supporting the idler sprocket, and means for moving the carrier to shift the idler sprocket transversely of the longitudinal axis of said chain, said moving means including a fluid cylinder supported adjacent said carrier, a piston reciprocable in the cylinder and connected to the carrier, and means cooperating with the cylinder for supplying an incompressible fluid to said cylinder to extend said piston and move said carrier.

2. Drive means for propelling a vehicle including at least one wheel having a sprocket connected thereto and a drive sprocket spaced from the wheel sprocket with a chain entrained over the sprockets; chain tightening means including at least one idler sprocket engaging said chain, a carrier rotatably supporting the idler sprocket and means for moving the carrier to shift the idler sprocket transversely of the longitudinal axis of said chain, said moving means including a fluid cylinder supported adjacent said carrier, a piston reciprocable in the cylinder and connected to the carrier, means cooperating with the cylinder for supplying an incompressible fluid to said cylinder to extend said piston and move said carrier, and relief valve means in the cylinder operable to relieve excess fluid when the pressure of the fluid exceeds a certain level to set the chain tension at a desired level.

3. Drive means as defined in claim 2, in which said relief valve means is located in a threaded opening in said cylinder, further including threaded plug means received in said threaded opening to render said relief valve means inoperative after the desired tension has been reached on said chain.

4. Drive means for propelling a vehicle including at least one wheel having a sprocket connected thereto and a drive sprocket spaced from the wheel sprocket with a chain entrained over the sprockets; chain tightening means including at least one idler sprocket engaging said chain, a carrier rotatably supporting the idler sprocket, and means for moving the carrier to shift the idler sprocket transversely of the longitudinal axis of said chain, said moving means including a fluid cylinder supported adjacent said carrier, a piston reciprocable in the cylinder and connected to the carrier, means cooperating with the cylinder for supplying an incompressible fluid to said cylinder to extend said piston and move said carrier, and indicating means in said moving means for showing that the chain has reached a predetermined worn condition.

5. Drive means as defined in claim 4, in which said indicating means prevents further extension of said piston in said cylinder.

6. Drive means as defined in claim 5, in which said cylinder and said piston cooperate to define a chamber and said indicating means includes means communicating with said chamber for placing said chamber in communication with the surrounding atmosphere when the piston reaches a predetermined extended position.

7. Drive means as defined in claim 6, in which said cylinder has an opening slidably supporting said piston with said opening having an annular groove communicating with the atmosphere and in which said piston has a bore having one end located in the end of the piston that is located in the chamber and its opposite end in the periphery of the cylinder at a location spaced from the end of the piston in the chamber, said opposite end of said bore being aligned with said groove and defining the communicating means when the piston reaches the predetermined extended position.

8. Drive means as defined in claim 1, in which said carrier is pivotally supported on the free end of said piston and has two idler sprockets rotatably supported thereon with the idler sprockets respectively engaging the inner and outer surfaces of the chain.

9. Drive means as defined in claim 1, in which said chain and sprockets are enclosed in a sealed compartment and said sealed compartment has a removable cover plate aligned with said means cooperating with the cylinder.

10. Drive means as defined in claim 9, in which the means cooperating with the cylinder is a grease gun fitting and the incompressible fluid is grease.

* * * * *